(12) United States Patent
Dudar et al.

(10) Patent No.: US 10,774,756 B1
(45) Date of Patent: Sep. 15, 2020

(54) SYSTEM AND METHOD FOR DIAGNOSING A POSITIVE CRANKCASE VENTILATION VALVE

(71) Applicant: Ford Global Technologies, LLC, Dearborn, MI (US)

(72) Inventors: Aed M. Dudar, Canton, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/427,156

(22) Filed: May 30, 2019

(51) Int. Cl.
| F02D 35/02 | (2006.01) |
| G01M 15/08 | (2006.01) |
| F02D 17/02 | (2006.01) |
| F02D 17/04 | (2006.01) |

(52) U.S. Cl.
CPC ............ *F02D 35/02* (2013.01); *F02D 17/02* (2013.01); *F02D 17/04* (2013.01); *G01M 15/08* (2013.01)

(58) Field of Classification Search
CPC .......... F02D 35/02; F02D 17/04; F02D 17/02; G01M 15/08
See application file for complete search history.

(56) References Cited

U.S. PATENT DOCUMENTS

| 5,792,949 | A | 8/1998 | Hewelt et al. | |
| 5,897,597 | A * | 4/1999 | O'Daniel | G01M 3/025 123/574 |
| 9,683,483 | B1 * | 6/2017 | Bidner | F02B 37/186 |
| 9,835,522 | B2 * | 12/2017 | Chen | F02M 35/1038 |
| 10,100,770 | B2 | 10/2018 | Dudar | |
| 2009/0211545 | A1 * | 8/2009 | Satou | F02D 41/221 123/41.86 |
| 2013/0213370 | A1 * | 8/2013 | Shirabe | F01M 13/0011 123/574 |
| 2013/0294937 | A1 * | 11/2013 | Worden | F04B 51/00 417/53 |
| 2014/0081549 | A1 * | 3/2014 | Rollinger | F02N 11/10 701/101 |
| 2014/0081551 | A1 * | 3/2014 | Rollinger | F01M 13/023 701/101 |
| 2014/0207360 | A1 * | 7/2014 | Monros | G06F 16/9535 701/113 |
| 2014/0238336 | A1 * | 8/2014 | McMullen | F02B 39/14 123/198 DC |
| 2015/0040878 | A1 * | 2/2015 | Yoshioka | F01M 13/0011 123/574 |
| 2016/0097354 | A1 * | 4/2016 | Martus | F01M 11/00 123/572 |

(Continued)

FOREIGN PATENT DOCUMENTS

| DE | 102004030908 A1 | 1/2006 |
| DE | 102017108246 A1 | 10/2018 |

*Primary Examiner* — Hung Q Nguyen
*Assistant Examiner* — Brian P Monahon
(74) *Attorney, Agent, or Firm* — Geoffrey Brumbaugh; McCoy Russell LLP

(57) ABSTRACT

Methods and systems are provided for detecting degradation of a positive crankcase ventilation (PCV) system valve and a cylinder valve. In one example, a method may include comparing a rate of pressure bleed-up in a PCV system during each of a cold-engine condition and a hot-engine condition to differentiate between the PCV valve and the cylinder valve.

20 Claims, 9 Drawing Sheets

(56) References Cited

U.S. PATENT DOCUMENTS

| | | | |
|---|---|---|---|
| 2016/0097355 A1* | 4/2016 | Jentz | F02M 35/1038 |
| | | | 701/102 |
| 2017/0002756 A1* | 1/2017 | Yudanov | F01M 13/0011 |
| 2017/0002761 A1* | 1/2017 | Dudar | F02M 25/06 |
| 2018/0003122 A1* | 1/2018 | Burkell | F02D 41/221 |
| 2018/0163659 A1* | 6/2018 | Dudar | B60W 50/0205 |

\* cited by examiner

SYSTEM AND METHOD FOR DIAGNOSING A POSITIVE CRANKCASE VENTILATION VALVE

FIELD

The present description relates generally to methods and systems for controlling a vehicle engine to diagnose whether a positive crankcase ventilation valve is functioning as desired.

BACKGROUND/SUMMARY

During a power stroke of piston of an engine cylinder, a portion of the gases combusted within the cylinder may escape past a ring forming a seal around the piston base in a process known as blow-by. The escaped gases may accumulate in the crankcase, resulting in a buildup of pressure that may lead to degradation of oil stored in the crankcase to lubricate piston movement. The engine may include a crankcase ventilation system to vent gases out of the crankcase and into an engine intake manifold to provide continual evacuation of gases from inside the crankcase in order to reduce degradation of various engine components in the crankcase. The crankcase ventilation system may include a positive crankcase ventilation valve (PCV valve) for enabling one-way flow of crankcase gases from inside the crankcase to the intake manifold.

Crankcase ventilation systems may be intermittently diagnosed for PCV valve degradation. One example approach for PCV valve diagnostics is shown by Satou in US 2009/0211545. Therein, PCV valve degradation is determined based on air changes (e.g., changes to a throttle position) and fuel changes (e.g., fuel injection adjustments) required to maintain an idle speed as an opening of the PCV valve is adjusted. The opening of the PCV valve is, in turn, selected based on an air/fuel ratio of blow-by gas.

However, the inventors herein have recognized potential issues with such approaches. As one example, the blow-by based diagnostics approach may have significant noise issues due to various engine loads. These include, for example, engine friction, barometric pressure, AC compressor load, alternator load, etc. Consequently, computation intensive noise reduction algorithms may be required. In hybrid electric vehicles (HEV) and plug-in hybrid electric vehicles (PHEV), engine run time may be limited, thereby providing fewer opportunities for PCV valve diagnostics. Other sources of degradation such as in the cylinder valves may limit identification of a PCV valve degradation during a PCV system diagnostic routine.

In one approach to at least partially address these issues, a method for an engine crankcase ventilation system is provided. The method for an engine comprises: differentiating between degradation of a positive crankcase ventilation system (PCV) valve, a crankcase ventilation tube, and a cylinder valve based on a rate of pressure bleed-up in a PCV system during each of a cold-engine condition and a hot-engine condition. In this way, by carrying out PCV system diagnostics in the cold engine condition and the hot engine condition, PCV valve degradation and cylinder valve degradation may be identified and differentiated.

In one example, the positive crankcase ventilation system may include each of an isolation valve coupled to a junction of crankcase ventilation tube and fresh air intake passage and a PCV valve coupled to PCV line. By closing each of the isolation valve and the PCV valve, the PCV system may be isolated from the air intake system. After an engine temperature reduces following an engine shut-down, a cold-engine PCV diagnostic routine may be initiated. The diagnostic routine may include closing the isolation valve and spinning the engine unfueled to generate an intake system vacuum. Once a desired intake system vacuum level is reached, a variable displacement engine (VDE) mechanism may be used to deactivate each of the deactivatable cylinders and the cylinder valves (intake valves and exhaust valves) of the deactivatable cylinders may be closed. Further, the engine may be rotated to stop at a desired position where the cylinder valves of the non-deactivatable cylinders are closed, thereby closing all cylinder valves. The PCV system may be evacuated via the PCV valve and once the vacuum is transferred to the PCV system, the PCV valve may be passively or actively closed. The vacuum decay in the PCV system may be monitored via a pressure sensor coupled to the crankcase ventilation tube. If it is determined that the rate of vacuum decay is lower than a threshold, it may be indicated that the PCV valve and the cylinder valves are not degraded. However, if it is determined that the rate of vacuum decay is higher than a threshold, immediately after a subsequent engine shut-down, a hot-engine PCV diagnostic routine may be initiated. If during the hot-engine diagnostic routine, the rate of vacuum decay in the PCV system is higher than a threshold, it may be indicated that the PCV valve is degraded. However, if during the hot-engine diagnostic routine, the rate of vacuum decay in the PCV system is lower than a threshold, it may be indicated that the PCV valve is not degraded but the cylinder valves may be degraded. Appropriate mitigating actions may be taken in response to detection of PCV valve/cylinder valves degradation.

In this way, by sealing the PCV system and monitoring vacuum decay in the PCV system during both cold-engine condition and hot-engine condition, PCV valve degradation and engine cylinder valve degradation may be identified and appropriate mitigating steps may be undertaken during subsequent engine cycles. By introducing the PCV isolation valve, it is possible to seal the PCV system when desired. The technical effect of carrying out the PCV system diagnostics during a vehicle key-off condition is that the diagnostics may be periodically carried out in HEV and PHEV vehicles where engine run time may be limited. Also, by carrying out the diagnostics during the vehicle key-off condition, change in engine noise due to the diagnostic routine may not be encountered by the operator. Overall, by regularly monitoring the health of the PCV system, desired engine emissions quality and fuel efficiency may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
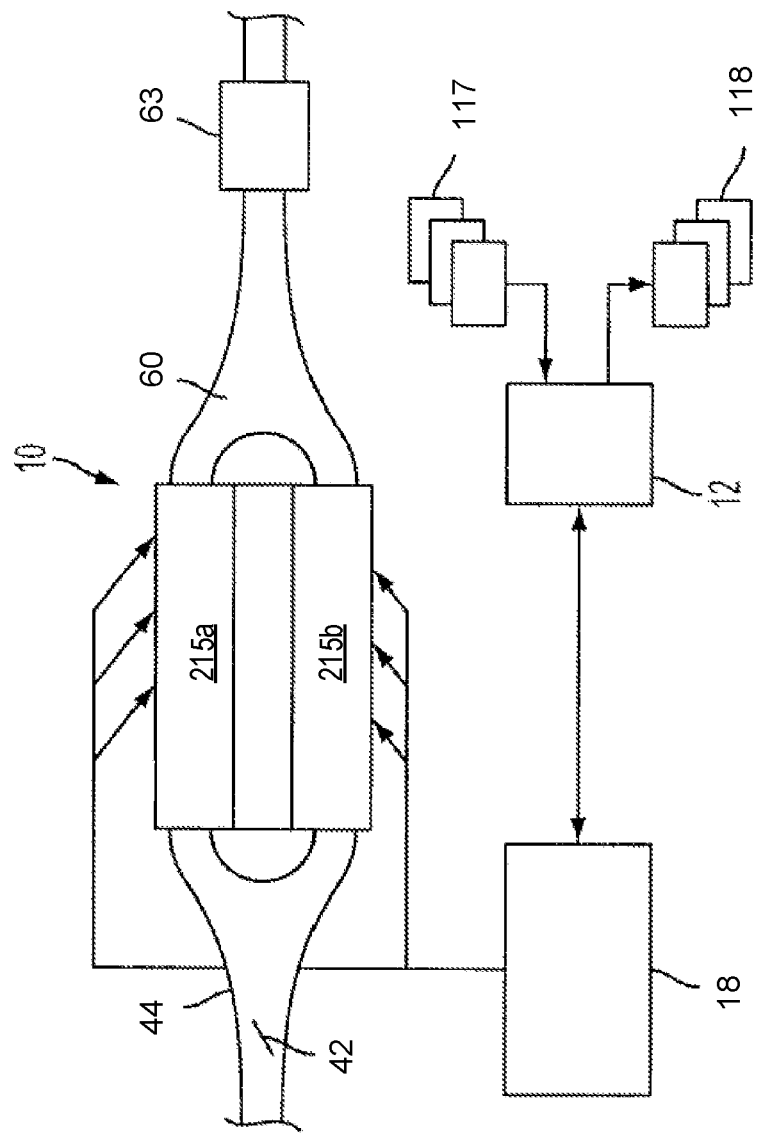
FIG. 2 schematically shows an example vehicle propulsion system including a variable displacement engine (VDE) mechanism.
Figure 3:
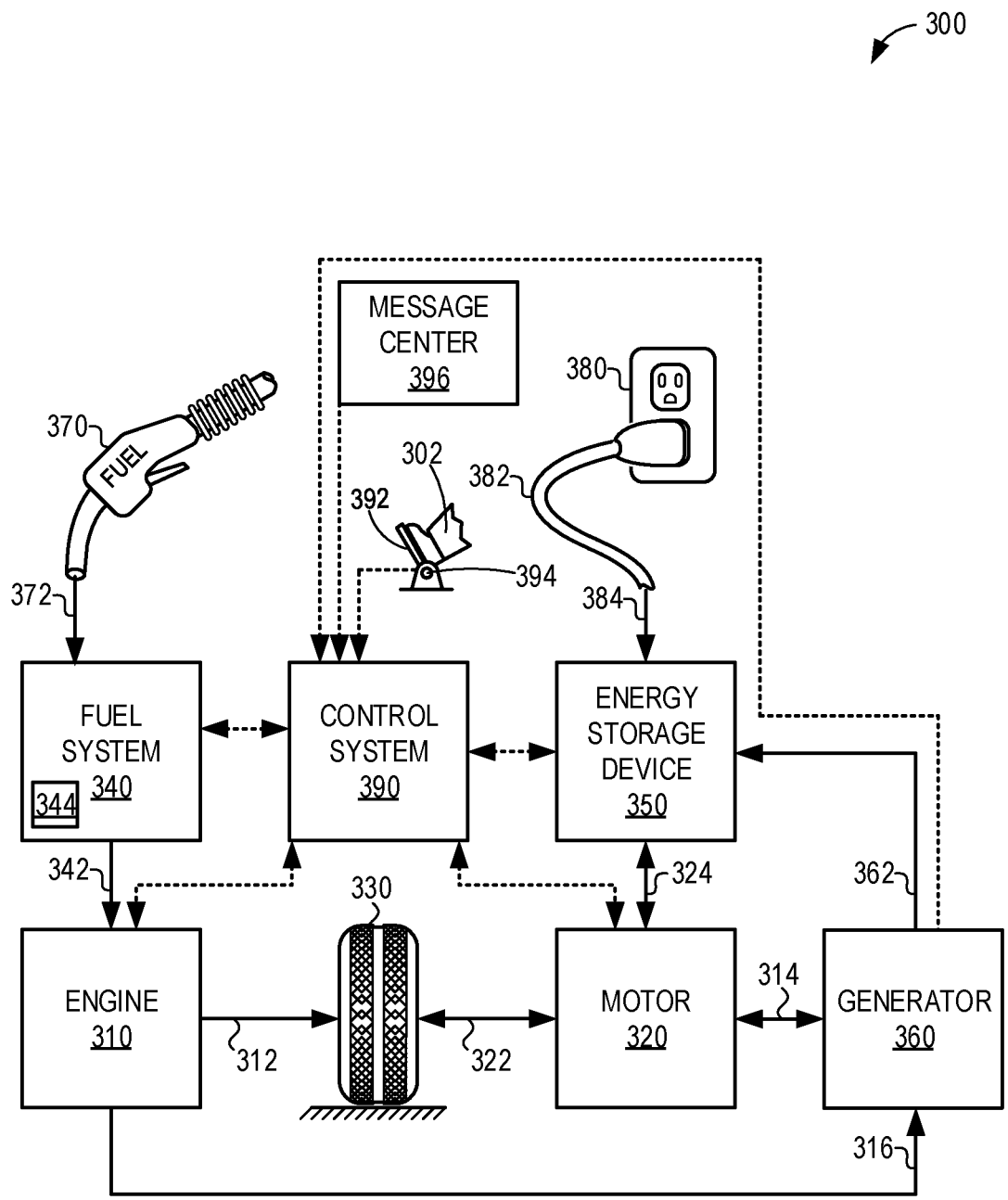
FIG. 3 schematically shows an example vehicle propulsion system of a plug-in electric vehicle.
Figure 4A:
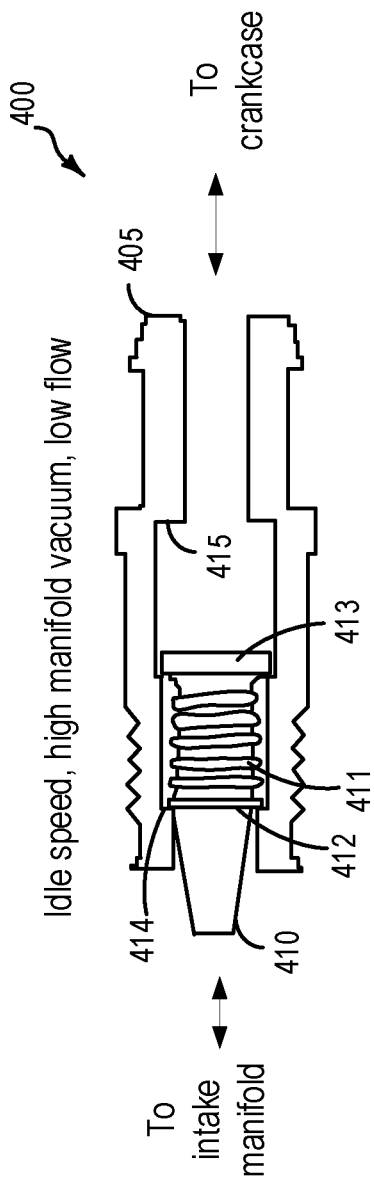
FIG. 4A illustrates a position of a PCV valve during idle speed, high intake manifold vacuum conditions.
Figure 4B:
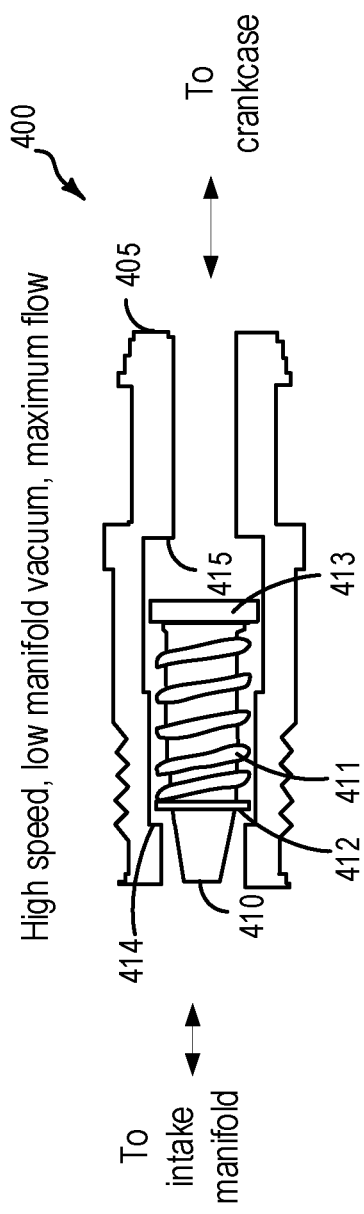
FIG. 4B illustrates a position of a PCV valve during high speed, low intake manifold vacuum conditions.
Figure 4C:
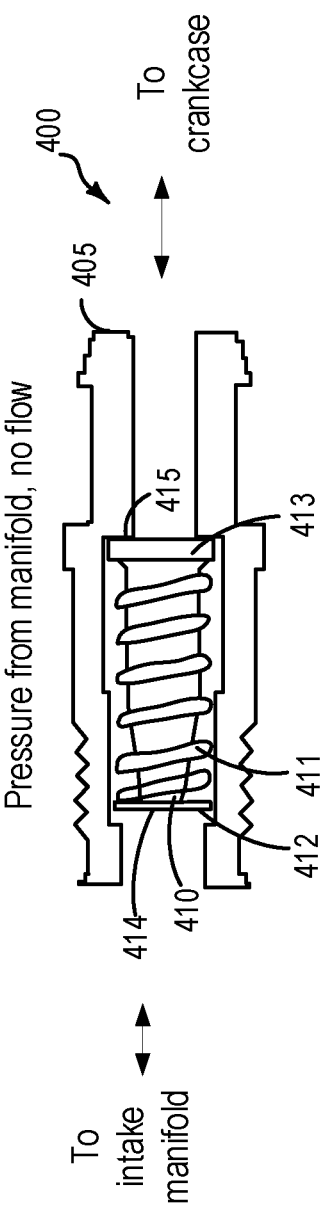
FIG. 4C illustrates a position of a PCV valve during conditions of positive intake manifold pressure conditions.
Figure 5:
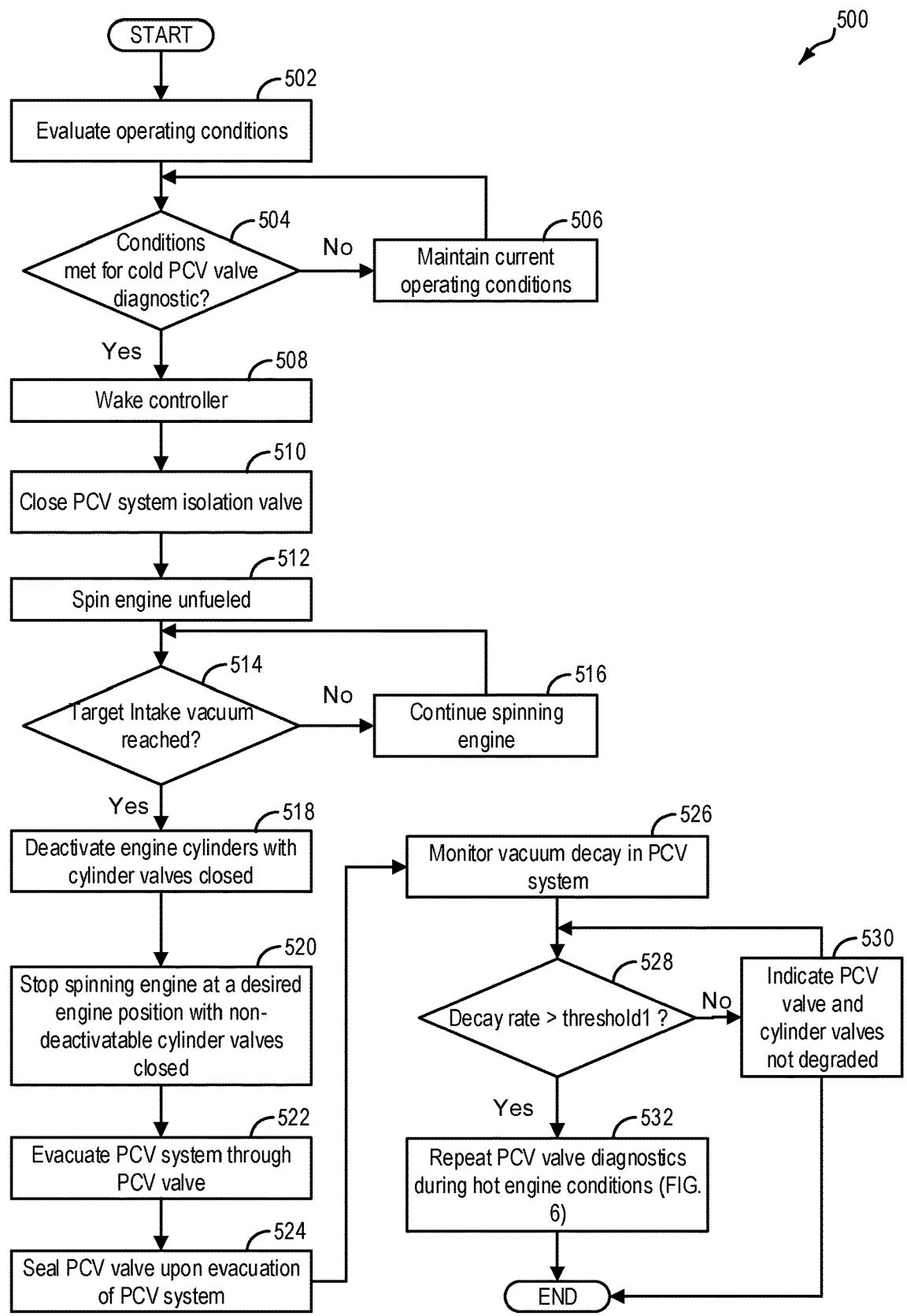
FIG. 5 shows a high level flowchart for an example method for diagnosing functionality of a PCV valve in a cold engine.
Figure 6:
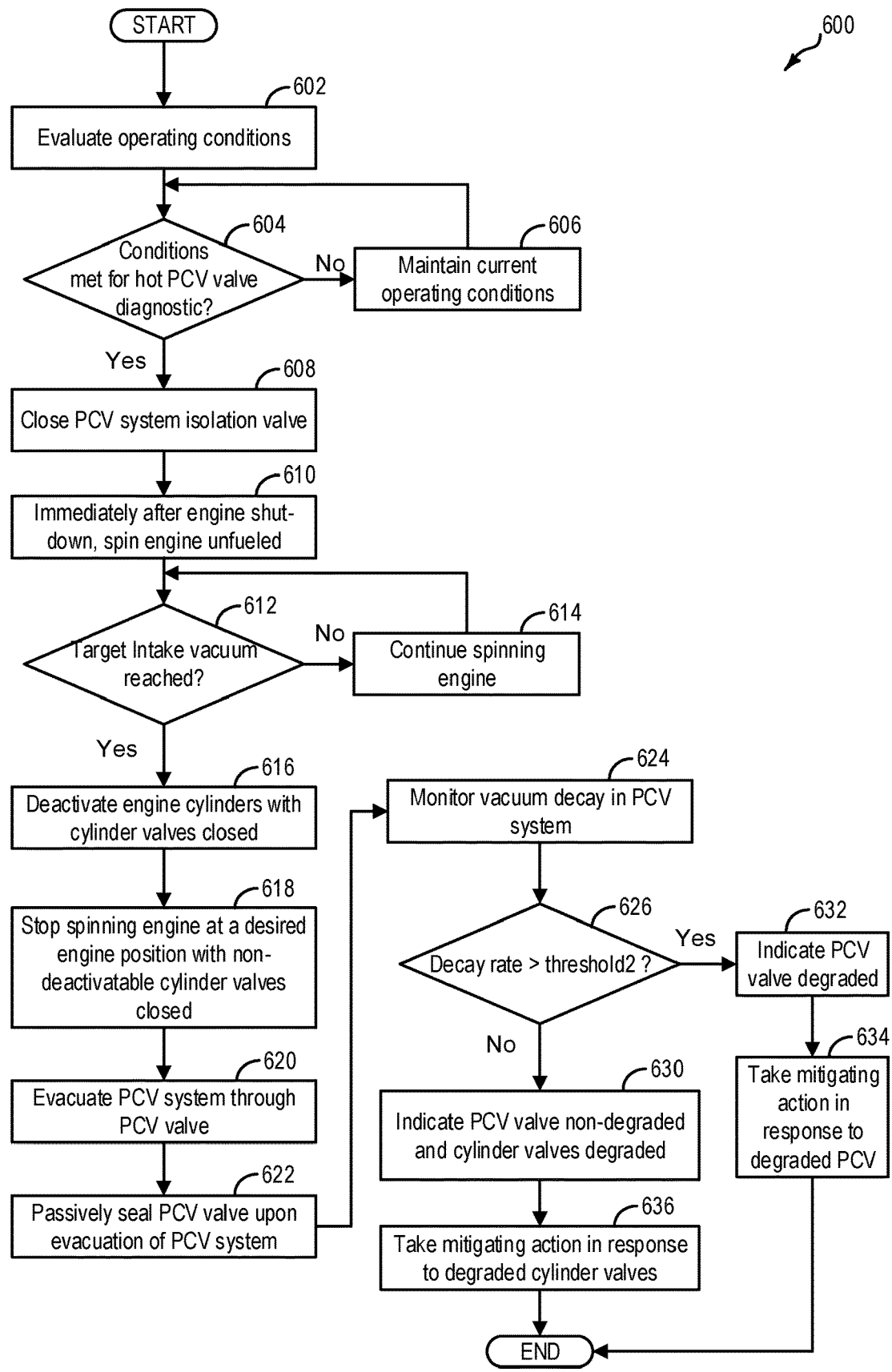
FIG. 6 shows a high level flowchart for an example method for diagnosing functionality of a PCV valve and cylinder valves in a hot engine.
Figure 7:
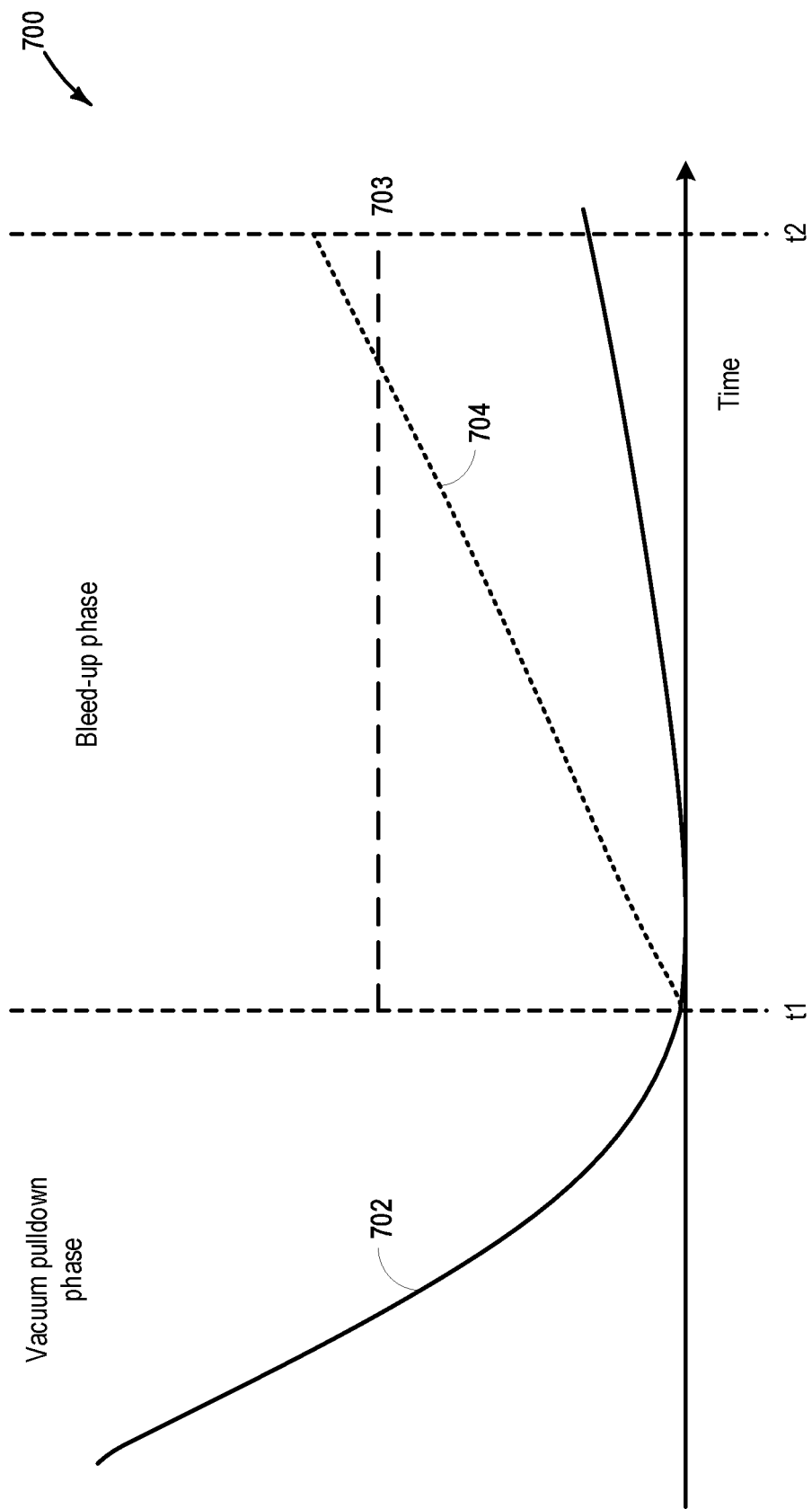
FIG. 7 shows an example plot of pressure in the PCV system during PCV valve diagnostics.
Figure 8:
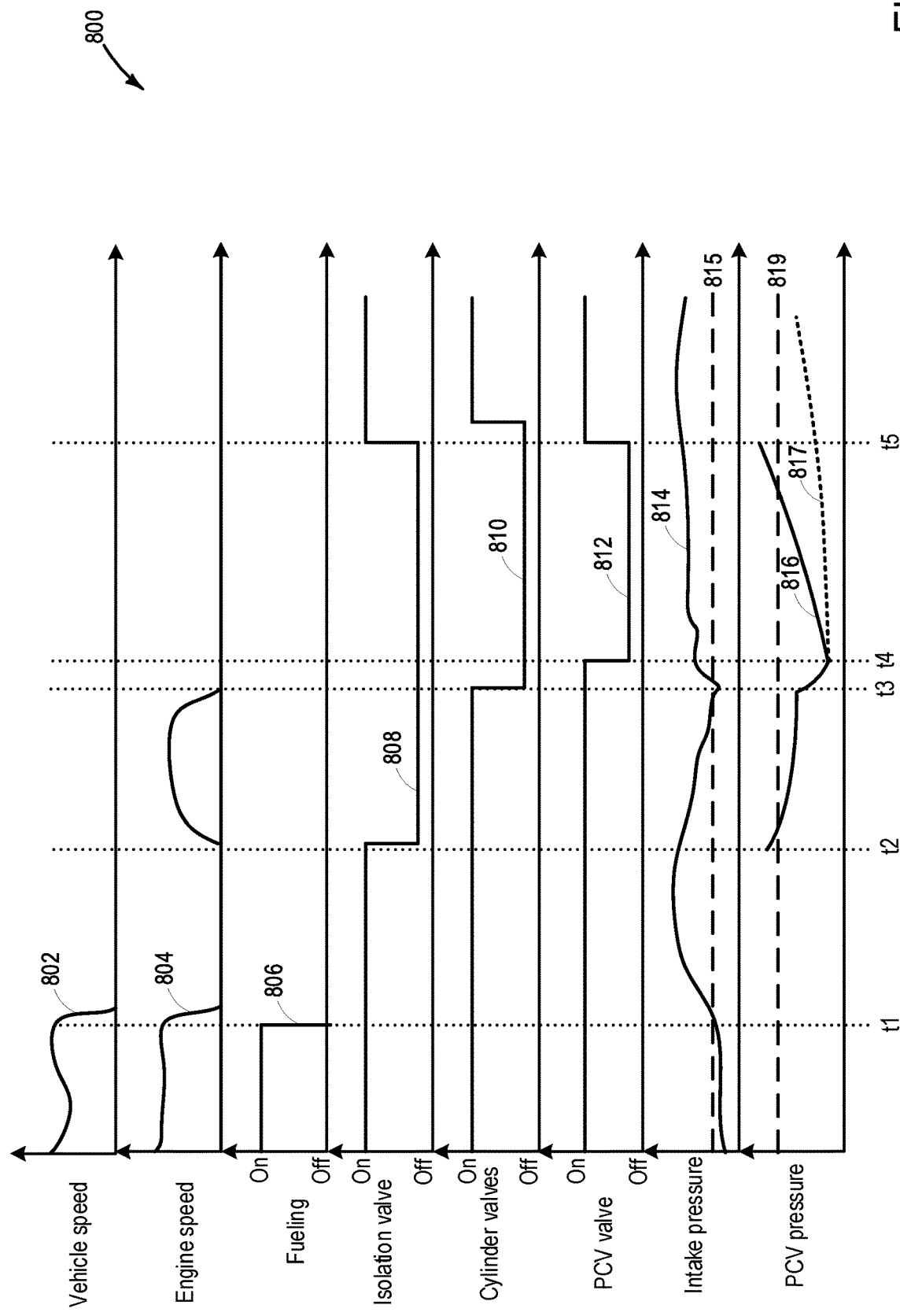
FIG. 8 shows an example timeline for an example PCV diagnostic test routine in a cold engine.
Figure 9:
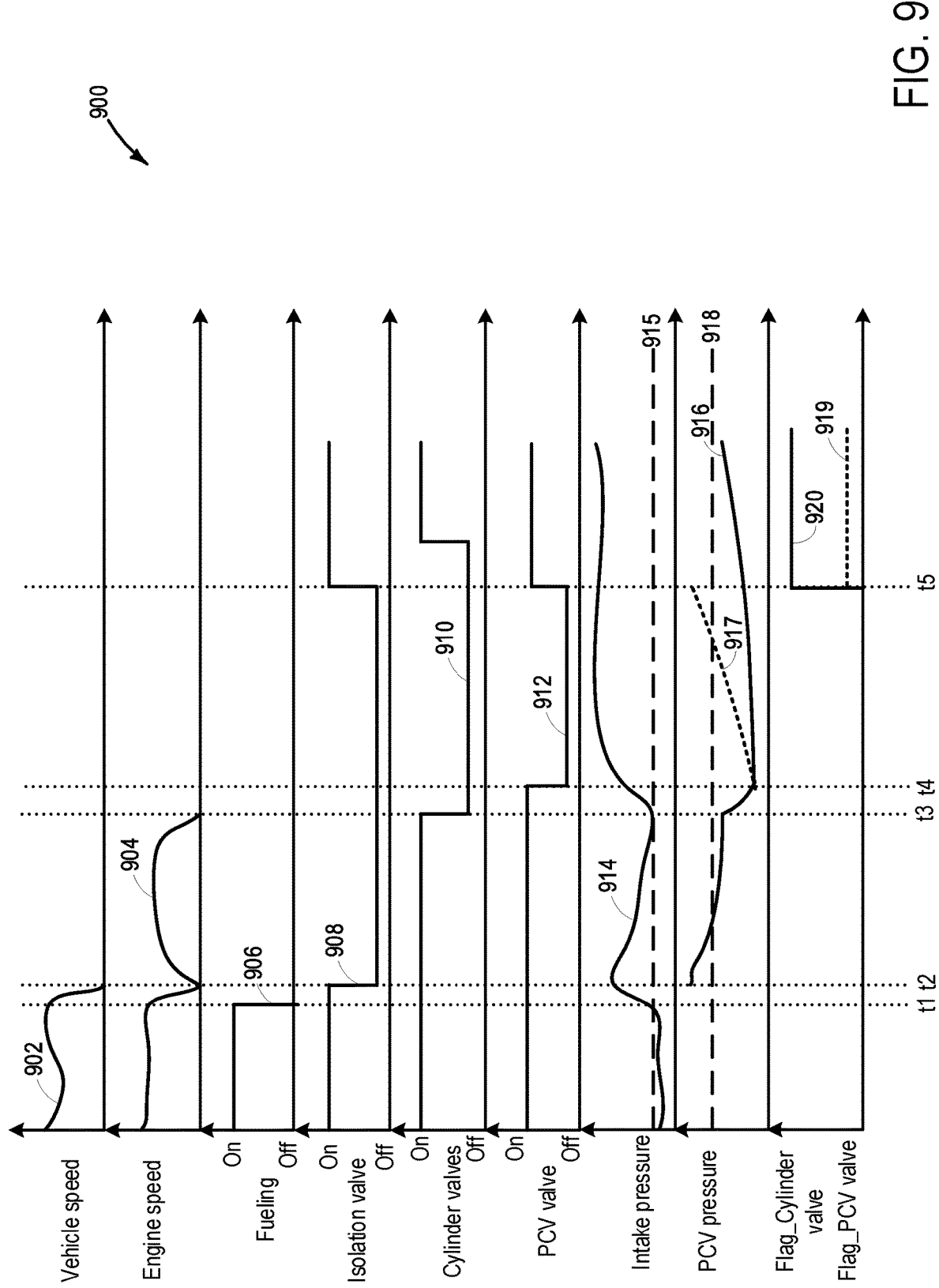
FIG. 9 shows an example timeline for an example PCV diagnostic test routine in a hot engine.

The following description relates to systems and methods for diagnosing whether a positive crankcase ventilation (PCV) valve and cylinder valves (intake valves and exhaust valves) are functioning as desired. Such a diagnostic may be performed on a vehicle system configured with a positive crankcase ventilation system, such as the vehicle system depicted in FIG. 1. The vehicle system may include a variable displacement engine (VDE) mechanism, as shown in FIG. 2, and an electric motor, as shown in FIG. 3. The PCV valve may occupy several different conformations, depending on a pressure level in an intake manifold of the engine, as illustrated in FIGS. 4A-4C. Example methods for conducting the PCV valve and the cylinder valves diagnostic test routine is illustrated at FIGS. 5-6. An example plot of the PCV system pressure during the PCV valve diagnostic routine is shown in FIG. 7. Example timelines for conducting the PCV valve and cylinder valves diagnostic, according to the methods of FIGS. 5-6, are illustrated at FIGS. 8-9.

Figure 1:
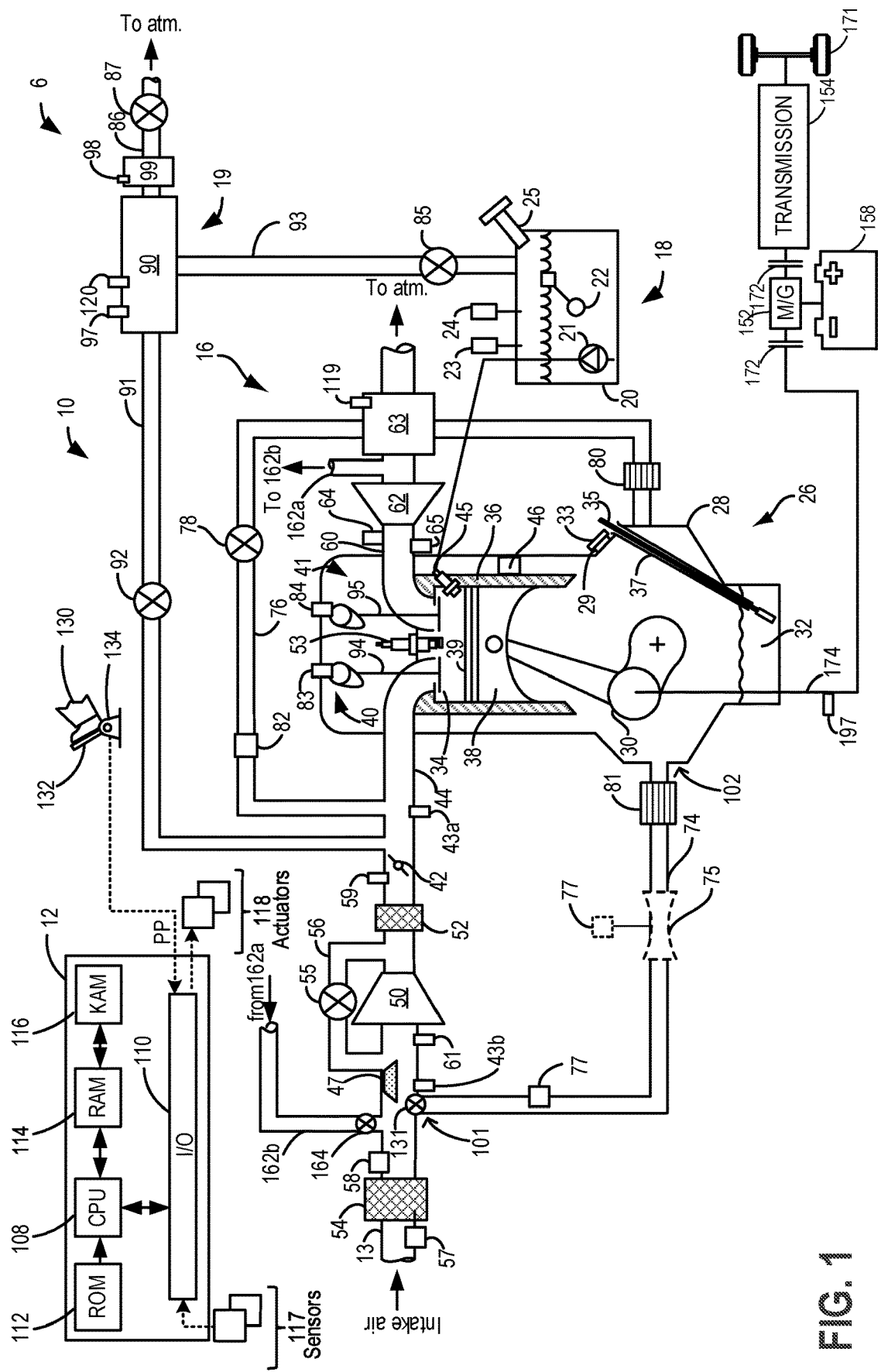
FIG. 1 shows a schematic description of an engine including an engine positive crankcase ventilation system (PCV).

Turning now to FIG. 1, a schematic depiction of a hybrid vehicle system 6 is presented that can derive propulsion power from engine system 10 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Three piston rings 39 may be coupled to the outer wall of the piston 38 to seal the combustion chamber. By sealing the combustion chamber, escape of combustion gases from the combustion chamber to the crankcase may be reduced. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. The intake and exhaust valve systems are discussed in further detail herein and with reference to FIG. 2. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As will be further discussed below at FIG. 2, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, an intake air oxygen sensor 43 may be positioned downstream of throttle 42. Furthermore, in some examples, an air intake system hydrocarbon (AIS HC) trap 47 may be positioned downstream of air filter 54, but upstream of compressor 50. As will be discussed in greater detail below, when conducting a PCV valve 78 test diagnostic procedure, residual fuel vapors may be captured and stored by AIS HC trap, such that fuel vapors are not routed to atmosphere. Furthermore, the intake air oxygen sensor may be used as a readout of the PCV valve test diagnostic to determine whether the PCV valve 78 is functioning as desired, as will be discussed in greater detail below.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A PCV isolation valve 131 may be coupled to the junction of the crankcase ventilation tube 74 (at the first side 101) and the fresh air passage 13 to regulate air flow into the PCV system. The PCV isolation valve 131 may be a may be configured as a continuously variable valve. In an alternate example, however, PCV isolation valve 131 may be configured as an on/off valve. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV line 76 may include a one-way valve (that is, a passive valve that tends to seal when flow is in the opposite direction) to prevent airflow from the intake manifold into the crankcase via PCV line 76 during boost conditions. In one embodiment, the PCV valve may actively or passively vary its flow restriction in response to the pressure drop across it (or flow rate through it). It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The PCV valve 78 may be periodically and/or opportunistically monitored along with cylinder valves (such as intake valve 94 and exhaust valve 95) to detect any degradation. During each of a cold-engine condition and a hot-engine condition, the isolation valve 131 may be closed and then the engine may be spun unfueled. In response to intake manifold negative pressure reaching a threshold pressure, the engine may be stopped, and intake and exhaust valves for all cylinders of the engine may be sealed. Sealing the intake valves and exhaust valves may include sealing intake valves and exhaust valves of deactivatable cylinders via actuation of a variable displacement engine (VDE) mechanism, and sealing intake valves and exhaust valves of non-deactivatable cylinders by spinning the engine unfueled to park each of the non-deactivatable cylinders in a position with each respective intake valve and exhaust valve closed. Upon sealing the intake valves and exhaust valves, air from the PCV system 16 may be routed to the intake passage via the PCV valve, the PCV valve 78 closing in response to a threshold negative pressure being reached in the PCV system 16. Upon closing of the PCV valve 78, a rate of pressure bleed-up in the PCV system 16 may be monitored via the pressure sensor 77. Degradation of the PCV valve 78 may be indicated in response to a higher than threshold rate of pressure bleed-up in the PCV system 16 during each of the cold-engine condition and the hot-engine condition and degradation of the cylinder valve may be indicated in response to the higher than threshold rate of pressure bleed-up in the PCV system during the cold-engine condition and a lower than threshold rate of pressure bleed-up during the hot-engine condition. As an example, the cold-engine condition includes a lower than threshold engine temperature attained after a threshold duration has elapsed since an engine shut-down, and a hot-engine condition includes a higher than threshold engine temperature immediately after another engine shut-down. In response to indication of degradation of the PCV valve, operation of a turbocharger may be reduced during immediately subsequent drive cycles.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be comprised in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. A loading state of vapor canister 90 may be indicated by a hydrocarbon sensor 120. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some embodiments, a pressure sensor may additionally be coupled between the canister 90 and the canister vent valve 87, such as pressure sensor 98 coupled to an evaporative level check module (ELCM) 99, for example. One or more temperature sensors 24 may also be coupled to fuel system 18 for providing an estimate of a fuel system temperature. A canister temperature sensor 97 may be coupled to canister 90 and configured to indicate temperature changes of the adsorbent material within the canister. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 91 may be regulated by canister purge valve 92, coupled between the fuel vapor canister and the engine intake.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, PCV valve 78, PCV isolation valve 131, CPV 92, FTIV 85, etc. Storage medium read-only memory 112 can be programmed with computer readable data representing instructions executable by processor 108 for performing the methods described below, as well as other variants that are anticipated but not specifically listed.

Further, controller 12 may be configured to intermittently perform diagnostic routines on the crankcase ventilation system. This may include, during a vehicle key-off condition, generating an intake manifold vacuum, transferring the vacuum to the PCV system, sealing the PCV system and monitoring decay of vacuum in the PCV system. In response to a higher than threshold rate of vacuum decay observed in a hot-engine condition and a cold-engine condition, a degradation of the PCV may be indicated and in response to a lower than threshold rate of vacuum decay observed in the hot-engine condition and a higher than threshold rate of vacuum decay observed in the cold-engine condition, a degradation of the cylinder valves may be indicated.

Turning to FIG. 2, it shows an example where engine 10 comprises a variable displacement engine (VDE), including a first bank 215a and a second bank 215b. In the depicted example, engine 10 is a V6 engine with the first and second banks each having three cylinders. However, in alternate embodiments, the engine may have a different number of engine cylinders, such as 4, 8, 10, 12, etc. Engine 10 has an intake manifold 44, with throttle 42, and an exhaust manifold 60 coupled to an emission control device 63. Emission control device 63 includes one or more catalysts and air-fuel ratio sensors, such as described with regard to FIG. 1. As one non-limiting example, engine 10 can be included as part of a propulsion system for a passenger vehicle.

During selected conditions, such as when the full torque capability of the engine is not needed, one or more cylinders, such as one of a first or second cylinder group, may be selected for deactivation (herein also referred to as a VDE mode of operation). Specifically, one or more cylinders may be deactivated by shutting off respective fuel injectors while commanding intake and exhaust valves closed. While fuel injectors of the disabled cylinders are turned off, the remaining enabled cylinders continue to carry out combustion with fuel injectors active and operating. To meet torque requirements, the engine may produce the same amount of torque on those cylinders for which the injectors remain enabled. This may require higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves wherein deactivating the cylinder includes deactivating the intake and/or exhaust valves.

Cylinders may be grouped for deactivation in a bank-specific manner. For example, in FIG. 2, the first group of cylinders may include the three cylinders of the first bank 215a while the second group of cylinders may include the three cylinders of the second bank 215b. In an alternate example, instead of one or more cylinders from each bank being deactivated together, two cylinders from each bank of the V6 engine may be selectively deactivated together. In still another example, only one cylinder may be deactivated. In still other examples, as will be discussed in detail below, any number of cylinders may be deactivated and fuel may be injected to the deactivated cylinder(s), in order to conduct a diagnostic routine to determine whether intake air oxygen sensor(s) (e.g. 43a, 43b) are functioning as desired.

Engine 10 may operate on a plurality of substances, which may be delivered via fuel system 18. Engine 10 may be controlled at least partially by a control system including controller 12. As discussed above, controller 12 may receive various signals from sensors 117 coupled to engine 10, and send control signals to various actuators 118 coupled to the engine and/or vehicle.

FIG. 3 illustrates an example vehicle propulsion system 300. It may be understood that vehicle propulsion system 300 may comprise the same vehicle propulsion system as hybrid vehicle system 6 depicted at FIG. 1. Vehicle propulsion system 300 includes a fuel burning engine 310 and a motor 320. It may be understood that engine 310 may be the same as engine 10 depicted above at FIGS. 1-2. As a non-limiting example, engine 310 comprises an internal combustion engine and motor 320 comprises an electric motor. Motor 320 may be configured to utilize or consume a different energy source than engine 310. For example, engine 310 may consume a liquid fuel (e.g., gasoline) to produce an engine output while motor 320 may consume electrical energy to produce a motor output. As such, a vehicle with propulsion system 300 may be referred to as a hybrid electric vehicle (HEV).

Vehicle propulsion system 300 may utilize a variety of different operational modes depending on operating conditions encountered by the vehicle propulsion system. Some of these modes may enable engine 310 to be maintained in an off state (i.e., set to a deactivated state) where combustion of fuel at the engine is discontinued. For example, under select operating conditions, motor 320 may propel the vehicle via drive wheel 330 as indicated by arrow 322 while engine 310 is deactivated.

During other operating conditions, engine 310 may be set to a deactivated state (as described above) while motor 320 may be operated to charge energy storage device 350. For example, motor 320 may receive wheel torque from drive wheel 330 as indicated by arrow 322 where the motor may convert the kinetic energy of the vehicle to electrical energy for storage at energy storage device 350 as indicated by arrow 324. This operation may be referred to as regenerative braking of the vehicle. Thus, motor 320 can provide a generator function in some examples. However, in other examples, generator 360 may instead receive wheel torque from drive wheel 330, where the generator may convert the kinetic energy of the vehicle to electrical energy for storage at energy storage device 350 as indicated by arrow 362.

During still other operating conditions, engine 310 may be operated by combusting fuel received from fuel system 340 as indicated by arrow 342. It may be understood that fuel system 340 may comprise the same fuel system as fuel system 18 depicted above at FIG. 1. For example, engine 310 may be operated to propel the vehicle via drive wheel 330 as indicated by arrow 312 while motor 320 is deactivated. During other operating conditions, both engine 310 and motor 320 may each be operated to propel the vehicle via drive wheel 330 as indicated by arrows 212 and 322, respectively. A configuration where both the engine and the motor may selectively propel the vehicle may be referred to as a parallel type vehicle propulsion system. Note that in some examples, motor 320 may propel the vehicle via a first set of drive wheels and engine 310 may propel the vehicle via a second set of drive wheels.

In other examples, vehicle propulsion system 300 may be configured as a series type vehicle propulsion system, whereby the engine does not directly propel the drive wheels. Rather, engine 310 may be operated to power motor 320, which may in turn propel the vehicle via drive wheel 330 as indicated by arrow 322. For example, during select operating conditions, engine 310 may drive generator 360 as indicated by arrow 316, which may in turn supply electrical energy to one or more of motor 320 as indicated by arrow 314 or energy storage device 350 as indicated by arrow 362. As another example, engine 310 may be operated to drive motor 320 which may in turn provide a generator function to convert the engine output to electrical energy, where the electrical energy may be stored at energy storage device 350 for later use by the motor.

Fuel system 340 may include one or more fuel storage tanks 344 for storing fuel on-board the vehicle. It may be understood that fuel storage tanks 344 may comprise the same fuel storage tank as fuel tank 20 depicted at FIG. 1. For example, fuel tank 344 may store one or more liquid fuels, including but not limited to: gasoline, diesel, and alcohol fuels. In some examples, the fuel may be stored on-board the vehicle as a blend of two or more different fuels. For example, fuel tank 344 may be configured to store a blend of gasoline and ethanol (e.g., E10, E85, etc.) or a blend of gasoline and methanol (e.g., M10, M85, etc.), whereby these fuels or fuel blends may be delivered to engine 310 as indicated by arrow 342. Still other suitable fuels or fuel blends may be supplied to engine 310, where they may be combusted at the engine to produce an engine output. The engine output may be utilized to propel the vehicle as indicated by arrow 312 or to recharge energy storage device 350 via motor 320 or generator 360.

In some examples, energy storage device 350 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 390 may communicate with one or more of engine 310, motor 320, fuel system 340, energy storage device 350, and generator 360. It may be understood that control system 390 may comprise the same control system as controller 12, depicted above at FIGS. 1-2. Control system 390 may receive sensory feedback information from one or more of engine 310, motor 320, fuel system 340, energy storage device 350, and generator 360. Further, control system 390 may send control signals to one or more of engine 310, motor 320, fuel system 340, energy storage device 350, and generator 360 responsive to this sensory feedback. Control system 390 may receive an indication of an operator requested output of the vehicle propulsion system from a vehicle operator 302. For example, control system 390 may receive sensory feedback from pedal position sensor 394 which communicates with pedal 392. Pedal 392 may refer schematically to a brake pedal and/or an accelerator pedal. It may be understood that pedal 392 may comprise the same pedal as pedal 132 depicted above at FIG. 1. It may be further understood that pedal position sensor 394 may comprise the same pedal position sensor as pedal position sensor 134 depicted above at FIG. 1.

Energy storage device 350 may periodically receive electrical energy from a power source 380 residing external to the vehicle (e.g., not part of the vehicle) as indicated by arrow 384. As a non-limiting example, vehicle propulsion system 300 may be configured as a plug-in hybrid electric vehicle (HEV), whereby electrical energy may be supplied to energy storage device 350 from power source 380 via an electrical energy transmission cable 382. During a recharging operation of energy storage device 350 from power source 380, electrical transmission cable 382 may electrically couple energy storage device 350 and power source 380. While the vehicle propulsion system is operated to propel the vehicle, electrical transmission cable 382 may disconnected between power source 380 and energy storage device 350. Control system 390 may identify and/or control the amount of electrical energy stored at the energy storage device, which may be referred to as the state of charge (SOC).

In other examples, electrical transmission cable 382 may be omitted, where electrical energy may be received wirelessly at energy storage device 350 from power source 380. For example, energy storage device 350 may receive electrical energy from power source 380 via one or more of electromagnetic induction, radio waves, and electromagnetic resonance. As such, it should be appreciated that any suitable approach may be used for recharging energy storage device 350 from a power source that does not comprise part of the vehicle. In this way, motor 320 may propel the vehicle by utilizing an energy source other than the fuel utilized by engine 310.

Fuel system 340 may periodically receive fuel from a fuel source residing external to the vehicle. As a non-limiting example, vehicle propulsion system 300 may be refueled by receiving fuel via a fuel dispensing device 370 as indicated by arrow 372. In some examples, fuel tank 244 may be configured to store the fuel received from fuel dispensing device 370 until it is supplied to engine 310 for combustion. In some examples, control system 390 may receive an indication of the level of fuel stored at fuel tank 344 via a fuel level sensor.

Turning to FIGS. 4A-4C, example illustrations of various conformations of a PCV valve during various engine operating conditions, is shown. More specifically, FIG. 4A illustrates a PCV valve 400 conformation during idle speed, high intake manifold vacuum conditions. FIG. 4B illustrates a conformation of PCV valve 400 during high speed, low intake manifold conditions. FIG. 4C illustrates a conformation of PCV valve 400 during conditions of positive pressure with respect to atmospheric pressure in the intake manifold. It may be understood that PCV valve 400 depicted at FIGS. 4A-4C may comprise the same PCV valve as PCV valve 78 depicted at FIG. 1.

Turning to FIG. 4A, PCV valve 400 may include a PCV valve housing 405, a plunger 410, and a spring 411. Furthermore, PCV valve 400 may include a first pintle 412, and a second pintle 413. Responsive to conditions of idle speed and high intake manifold vacuum, the high intake manifold vacuum may draw the plunger 410 toward the intake manifold, resulting in the first pintle 412 seating against a first valve seat 414. As such, under high intake manifold vacuum conditions, PCV valve 400 adopts a low flow conformation. In other words, fluid flow from the crankcase may be reduced as a result of the first pintle 412 seating against the first valve seat 414.

Turning to FIG. 4B, PCV valve 400 is illustrated under conditions of high engine speed, and low intake manifold vacuum. Responsive to conditions of high engine speed, and low intake manifold vacuum, spring 411 may push first pintle 412 away from first valve seat 414, thus allowing more fluid flow. Furthermore, second pintle 413 may not contact second valve seat 415, and as such, a high engine speed, low intake manifold vacuum condition may represent a condition where fluid flow through PCV valve 400 is the least restricted.

Turning to FIG. 4C, PCV valve 400 is illustrated under conditions of positive intake manifold pressure. Under such conditions, PCV valve 400 may close. More specifically, positive pressure in the intake manifold may result in second pintle 413 seating against second valve seat 415, thus restricting fluid flow from the intake manifold to the crankcase.

As discussed above, the passively controlled PCV valve may occupy different configurations as a function of intake manifold pressure. In another embodiment, the PCV valve may be actively controlled, and the engine controller may send a signal to an actuator coupled to the PCV valve to actuate the valve to a desired position (such as an open position, a closed position, or an intermediate position) based on engine operating conditions.

In this way, the components of FIGS. 1-4 enable an on-board controller including computer-readable instructions stored on non-transitory memory to: responsive to a predetermined time duration elapsing since a key-off event, spin an engine un-fueled to generate a negative pressure in an intake manifold, transfer the generated negative pressure to a positive crankcase ventilation system (PCV) via a PCV valve housed in a conduit coupling the intake manifold to the PCV system, seal the PCV system, and monitor a first rate of pressure increase in the PCV system via a PCV system pressure sensor, responsive to the first rate of pressure increase being higher than a threshold rate, immediately after a subsequent engine shut-down, spin the engine un-fueled to generate the negative pressure in the intake manifold, transfer the generated negative pressure to PCV system via the PCV valve, seal the PCV system, and monitor a second rate of pressure increase in the PCV system via the PCV system pressure sensor, in response to the second rate of pressure increase being higher than the threshold rate, indicate degradation of the PCV valve, and in response to the first rate of pressure increase being higher than the threshold rate and the second rate of pressure increase being lower than the threshold rate, indicate degradation of at least one intake valve and exhaust valve coupled to an engine cylinder.

FIG. 5 is a flow chart of a method 500 for diagnosing functionality of a positive crankcase ventilation system valve (such as PCV valve 78 of PCV system 16 in FIG. 1) in a cold engine. Instructions for carrying out method 500 and the rest of the methods included herein may be executed by a controller based on instructions stored on a memory of the controller and in conjunction with signals received from sensors of the engine system, such as the sensors described above with reference to FIGS. 1 and/or 2. The controller may employ engine actuators of the engine system to adjust engine operation, according to the methods described below.

At 502, the method may include evaluating current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 504, the routine includes determining whether conditions are met for carrying out a PCV valve diagnostic. Conditions for a PCV valve diagnostic may include a time duration since a key-off event being greater than a predetermined time duration. For example, the predetermined time duration may comprise an amount of time where it may be expected that engine oil in the crankcase (such as crankcase 28 in FIG. 1) has cooled to a predetermined temperature and also the engine coolant temperature has reduced to a different predetermined temperature. The predetermined time durations may in some examples comprise less than one hour, greater than one hour but less than three hours, or greater than three hours. However, such examples are meant to be illustrative, and are not meant to be limiting. Said another way, the condition may include a cold-engine condition. When the engine is cold, a clearance between a piston ring and the corresponding cylinder bore may be greater relative to the clearance during a hot engine condition (due to expansion of piston ring and corresponding cylinder bore). In some examples, conditions being met for a PCV valve diagnostic may further include an indication that the vehicle is not occupied. For example, such an indication may be provided via seat load cells configured to indicate the presence or absence of a vehicle operator and/or passengers in the vehicle. Conditions for the PCV valve diagnostic procedure may further include an indication that a predetermined time period has elapsed since a previous PCV valve diagnostic procedure.

If it is determined that conditions are not met for conducting the PCV valve diagnostic procedure, at 506, current vehicle operating conditions may be maintained. For example, if the vehicle is operating via the engine, then engine operation may be maintained. If the vehicle is in a key-off condition, yet the predetermined time duration has not yet elapsed in order to conduct the PCV valve diagnostic, then the vehicle controller may be maintained in a sleep mode, for example.

Responsive to conditions being met for conducting the PCV valve diagnostic procedure, at 508, the routine includes waking the controller. Upon waking the controller, at 510, the controller may send a signal to an actuator coupled to a PCV isolation valve to close the valve. A PCV isolation valve (such as isolation valve 131 in FIG. 1) may be coupled to a junction of a crankcase ventilation tube (at the first side) and a fresh air passage to regulate air flow into the PCV system. The PCV isolation valve may be housed in a conduit that fluidically couples the PCV system to the intake passage upstream of the compressor.

At 512, the engine may be spun unfueled. An electric motor (such as motor 320 in FIG. 3) may be operated to spin the engine. Accordingly, the controller may send a signal to the electric motor, commanding the electric motor to spin the engine. The controller may be further configured to disable spark and fuel injection. The controller may send a signal to the throttle to open the throttle. In some examples the degree to which the throttle is commanded open by the controller may be a percentage of a maximum amount of throttle opening possible (e.g. a position greater than, or more open, than a fully closed position). In still other examples, the throttle may be commanded open to a maximum, or fully open, amount (e.g. wide-open throttle). Spinning the engine may generate a lower pressure (vacuum) in the engine intake manifold. The speed at which the engine is rotated and the degree of opening of the throttle may be determined based on the desired intake manifold pressure (vacuum). In one example, the controller may use a look-up table with the desired intake manifold pressure as input and a speed of engine rotation and a degree of throttle opening as output.

At 514, the routine includes determining if a target vacuum level is reached. Pressure in the air intake system may be monitored via a manifold air pressure (MAP) sensor. The target vacuum may correspond to a pre-calibrated level of vacuum at which PCV valve diagnostics may be carried out. If it is determined that the target vacuum level is not reached, at 516, the engine may be continued to be spun, unfueled, via the motor, to generate the intake manifold vacuum. If it is determined that the target vacuum level has been reached, at 518, a deactivatable engine cylinder may be selectively deactivated using a variable displacement engine (VDE) technology. Each of the cylinders (which in some examples may include all cylinders) that are deactivatable may be commanded sealed. For example, sealing the deactivatable engine cylinders may include the controller sending a signal to the first VDE actuator (such as actuator 83 in FIG. 1) commanding the intake valve(s) closed, and may further include sending a signal to the second VDE actuator (such as actuator 84 in FIG. 1), actuating the exhaust valve(s) closed.

At 520, speed profile of the engine may be adjusted to stop the engine in a desired engine stop position where the non-deactivatable cylinder valves are closed, such as by stopping a non-deactivatable cylinder piston in a power stroke. As an example, the engine speed profile may be adjusted by adjusting the motor torque. In one example, if the engine speed is higher than an engine speed at which the desired engine stop position may be reached, the motor torque may be reduced to lower the engine speed such that upon engine stop, the engine reaches the desired engine stop position. At the desired engine stop position, the one or more camshafts coupled to the non-deactivatable cylinder valves may be actuated to close the deactivatable cylinder valves (both intake valves and exhaust valves). In this way, all engine cylinder valves may be closed at engine stop. By closing the intake valves and exhaust valves of all cylinders and closing the PCV isolation valve, all fluidic communication to the PCV system may be solely via the PCV valve.

At 522, air from the PCV system such as air in the crankcase ventilation tube, the crankcase, and the PCV line may be evacuated through the PCV valve. If the PCV valve is an actively actuated valve, the controller may send a signal to the actuator of the PCV valve to open the valve. If the PCV valve is a passively actuated valve (such as the PCV valve described in FIGS. 4A-4C), the manifold vacuum may be maintained below a threshold level such that the PCV valve is in an open position (such as the configuration shown in FIG. 4B). As the PCV system is evacuated, a drop in pressure in the PCV system may be monitored via a pressure sensor (such as pressure sensor 77 in FIG. 1) coupled to the crankcase ventilation tube. Once the PCV system is evacuated, the intake manifold pressure may be higher than the pressure in the PCV system.

Upon evacuation of the PCV system, such as when the pressure in the PCV system reduces to below a threshold pressure, at 524, the PCV valve may be closed to contain the vacuum in the PCV system. The threshold pressure may correspond to a level of vacuum desired to carry out PCV diagnostics based on vacuum bleed up. If the PCV valve is an actively actuated valve, the controller may send a signal to the actuator of the PCV valve to open the valve. If the PCV valve is a passively actuated valve, the positive pressure in the intake manifold may force the valve to close (such as the configuration shown in FIG. 4C).

Once the evacuated PCV system is sealed, at 526, vacuum decay in the PCV system may be monitored via the pressure sensor coupled to the crankcase ventilation tube. If the PCV valve is degraded and is stuck in a partially or completely open position, air from the intake manifold may enter the PCV system via the PCV valve resulting in a faster decay in vacuum relative to the condition when the PCV valve is closed. Also, if one or more engine cylinder valves (intake valves and exhaust valves) are degraded such as stuck at a partially or a completely open position, air may enter the PCV system via the cylinder valve resulting in a faster decay in vacuum relative to the condition when all cylinder valves are closed. Since the engine is cold, due to the increased clearance between the piston ring and the bore of the cylinder, air may flow into the PCV system via the stuck open engine valves. A rate of vacuum decay (rate of pressure increase) in the PCV system may be estimated. At 528, the routine includes determining if the vacuum decay rate is higher than a first threshold rate. The first threshold rate may be pre-calibrated based on a functioning (non-degraded) PCV valve operation. If it is determined that the vacuum decay rate is lower than the threshold rate, it may be inferred that PCV valve and the engine cylinders may not be stuck in an open position. At 530, the routine includes indicating that the PCV valve and the engine cylinders are not degraded.

However, if it is determined that the decay rate is higher than the threshold rate, at 532, it may be inferred that either the PCV valve or one or more of the cylinder valves may be stuck at a partially or completely open position. Due to the open position of the PCV valve or the engine valve(s), air from the intake manifold may enter the PCV system at an increased rate, thereby causing expedited vacuum decay. In order to identify if the degradation is in the PCV valve or the engine cylinders, as elaborated with reference to FIG. 6, the PCV valve diagnostics may be repeated during hot engine conditions.

FIG. 6 is a flow chart of a method 600 for diagnosing functionality of a positive crankcase ventilation system valve (such as PCV valve 78 of PCV system 16 in FIG. 1) in a hot engine. The method 600 may be a continuation of method 500 in FIG. 6 and may be carried out at step 532 of FIG. 5. At 602, the method may include evaluating current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 604, the routine includes determining whether conditions are met for carrying out a PCV valve diagnostic. Conditions being met for a PCV valve diagnostic may include an engine shut-down in a key-off event. Said another way, the condition may include a hot-engine condition immediately after an engine shut-down. When the engine is hot, the piston rings may be in face sharing contact with the cylinder bore and a clearance between piston rings and the corresponding cylinder bores may be lower relative to the clearance during a cold engine condition (due to expansion of piston ring and corresponding cylinder bore). In some examples, conditions being met for a PCV valve diagnostic may further include an indication that the vehicle is not occupied. For example, such an indication may be provided via seat load cells configured to indicate the presence or absence of a vehicle operator and/or passengers in the vehicle. Conditions being met for the PCV valve diagnostic procedure may further include an indication that a predetermined time period has elapsed since a previous PCV valve diagnostic procedure.

If it is determined that the conditions are not met for conducting the PCV valve diagnostic procedure, at 606, current vehicle operating conditions may be maintained. For example, if the vehicle is operating via the engine, then engine operation may be maintained. Responsive to conditions being met for conducting the PCV valve diagnostic procedure, immediately after engine shut-down, at 608, the controller may send a signal to actuator coupled to a PCV isolation valve to close the valve. A PCV isolation valve (such as isolation valve 131 in FIG. 1) may be coupled to a junction of a crankcase ventilation tube (at the first side) and a fresh air passage to regulate air flow into the PCV system.

At 610, the engine may be spun unfueled. An electric motor (such as motor 320 in FIG. 3) may be operated to spin the engine. Accordingly, the controller may send a signal to the electric motor, commanding the electric motor to spin the engine. The controller may be further configured to disable spark and fuel injection. The controller may send a signal to the throttle to open the throttle. In some examples the degree to which the throttle is commanded open by the controller may be a percentage of a maximum amount of throttle opening possible (e.g. a position greater than, or more open, than a fully closed position). In still other examples, the throttle may be commanded open to a maximum, or fully open, amount (e.g. wide-open throttle). Spinning the engine may generate a lower pressure (vacuum) in the engine intake manifold. The speed at which the engine is rotated and the degree of opening of the throttle may be determined based on the desired intake manifold pressure (vacuum). In one example, the controller may use a look-up table with the desired intake manifold pressure as input and a speed of engine rotation and a degree of throttle opening as output.

At 612, the routine includes determining if a target vacuum level is reached. Pressure in the air intake system may be monitored via a manifold air pressure (MAP) sensor. The target vacuum may correspond to a pre-calibrated level of vacuum at which PCV valve diagnostics may be carried out. If it is determined that the target vacuum level is not reached, at 614, the engine may be continued to be spun, unfueled, via the motor to generate the intake manifold vacuum. If it is determined that the target vacuum level has been reached, at 616, deactivatable engine cylinder may be selectively deactivated using a variable displacement engine (VDE) technology. Each of the cylinders (which in some examples may include all cylinders) that are deactivatable may be commanded sealed. For example, sealing the deactivatable engine cylinders may include the controller sending a signal to the first VDE actuator (such as actuator 83 in FIG. 1) commanding the intake valve(s) closed, and may further include sending a signal to the second VDE actuator (such as actuator 84 in FIG. 1), actuating the exhaust valve(s) closed.

At 618, speed profile of the engine may be adjusted to stop the engine in a desired engine stop position where the non-deactivatable cylinder valves are closed, such as by stopping a non-deactivatable cylinder piston in a power stroke. As an example, the engine speed profile may be adjusted by adjusting the motor torque. In one example, if the engine speed is higher than an engine speed at which the desired engine stop position may be reached, the motor torque may be reduced to lower the engine speed such that upon engine stop, the engine reaches the desired engine stop position. At the desired engine stop position, the one or more camshafts coupled to the non-deactivatable cylinder valves may be actuated to close the deactivatable cylinder valves (both intake valves and exhaust valves). In this by all engine cylinder valves may be closed at engine stop. By closing the intake valves and exhaust valves of all cylinders and closing the PCV isolation valve, all fluidic communication to the PCV system may be solely via the PCV valve.

At 620, air from the PCV system such as air in the crankcase ventilation tube, the crankcase, and the PCV line may be evacuated through the PCV valve. If the PCV valve is an actively actuated valve, the controller may send a signal to the actuator of the PCV valve to open the valve. If the PCV valve is a passively actuated valve (such as the PCV valve described in FIGS. 4A-4C), the manifold vacuum may be maintained below a threshold level such that the PCV valve is in an open position (such as the configuration shown in FIG. 4B). As the PCV system is evacuated, a drop in pressure in the PCV system may be monitored via a pressure sensor (such as pressure sensor 77 in FIG. 1) coupled to the crankcase ventilation tube. Once the OCV system is evacuated, the intake manifold pressure may be higher than the pressure in the PCV system.

Upon evacuation of the PCV system, such as when the pressure in the PCV system reduces to below a threshold pressure, at 622, the PCV valve may be closed to contain the vacuum in the PCV system. The threshold pressure may correspond to a level of vacuum desired to carry out PCV diagnostics based on vacuum bleed up. If the PCV valve is an actively actuated valve, the controller may send a signal to the actuator of the PCV valve to open the valve. If the PCV valve is a passively actuated valve, the positive pressure in the intake manifold may force the valve to close (such as the configuration shown in FIG. 4C).

Once the evacuated PCV system is sealed, at 624, vacuum decay in the PCV system may be monitored via the pressure sensor coupled to the crankcase ventilation tube. If the PCV valve is degraded and is stuck in a partially or completely open position, air from the intake manifold may enter the PCV system via the PCV valve resulting in a faster decay in vacuum relative to the condition when the PCV valve is closed. Also, if one or more engine cylinder valves (intake valves and exhaust valves) are degraded such as stuck at a partially or a completely open position, air may enter the PCV system via the cylinder valve resulting in a faster decay in vacuum relative to the condition when all cylinder valves are closed. Since the engine is hot, due to the decreased clearance between the piston ring and the bore of the cylinder, air may not flow into the PCV system via stuck open engine valves. A rate of vacuum decay (rate of pressure increase) in the PCV system may be estimated.

At 626, the routine includes determining if the vacuum decay rate is higher than a second threshold rate. The second threshold rate may be pre-calibrated based on a functioning (non-degraded) PCV valve operation and cylinder valves. In one example, the second threshold may be same as the first threshold (of step 528 in FIG. 5). If it is determined that the vacuum decay rate is lower than the second threshold rate, it may be inferred that PCV valve is not degraded and is in a closed position. Since the piston rings are sealing the cylinder bore from the crankcase, air flow caused by a stuck open cylinder valve may not reach the PCV system and therefore may not cause a vacuum decay in the PCV system (as monitored via the PCV system pressure sensor). However, since in step 528 in FIG. 5 it is determined that the vacuum decay rate in a PCV system of a cold engine is higher than the threshold rate, it may be inferred that one or more of the cylinder valves may be stuck at a partially or completely open position. In the cold engine condition, due to the increased clearance between the piston ring and the bore of the cylinder, air may flow into the PCV system via the stuck open engine valves. Therefore, by a combination of a higher than threshold vacuum decay rate in a cold engine and a lower than threshold vacuum decay rate in a hot engine, at 630, it may be indicated that the PCV valve is non-degraded but one or more cylinder valves (intake valves and/or exhaust valves) may be degraded and a corresponding diagnostics code (flag) may be set.

At 636, in response to the detection of degradation of the engine valves, mitigating actions may be taken. As an example, during an immediately subsequent engine cycle, one or more cylinders with degraded cylinder valves (either stuck open or closed) may be identified and the identified cylinders may be selectively deactivated until rectification (by a service action or hardware intermittency) of degradation of the valves. Deactivating the identified cylinders may include closing each of the intake valve and exhaust valve of the identified cylinders and also disabling fueling and spark to the identified cylinders.

If at 626 it is determined that the vacuum decay rate is higher than the second threshold rate, it may be inferred that air may be entering the PCV system via a PCV valve that is stuck in an open position. Since the piston rings are sealing the cylinder bore from the crankcase, air flow caused by a stuck open cylinder valve may not reach the PCV system and therefore may not cause a vacuum decay in the PCV system. Therefore, at 632, a PCV valve degradation may be indicated and a diagnostic code (flag) may be set.

A degradation (such as a leak) in the crankcase ventilation tube may also cause air to enter the PCV system from the intake manifold when the piston rings are sealing the cylinder bore from the crankcase and also the PCV valve is closed. Therefore, in response to a higher than second threshold rate of vacuum decay, it may also be indicated that one of the PCV and the crankcase ventilation tube is degraded.

At 634, in response to the PCV valve being stuck in an open position or a degradation of the crankcase ventilation tube, mitigating action may be taken. In one example, boosted engine operation may be limited, or discontinued during future drive cycles, until it is indicated that actions have been taken to ensure the PCV valve is functioning as desired. For example, if boosted engine operation were not limited, or discontinued, then the stuck open PCV valve may result in crankcase gasses and oil mist being blown into the inlet of the compressor, which may lead to a rapid oil consumption risk. Accordingly, such an adverse conditions may be reduced by limiting or discontinuing boosted engine operation.

In this way, at both a first engine temperature and a second engine temperature, an engine may be spun unfueled to establish a threshold negative pressure in a positive crankcase ventilation system and then spinning the engine may be discontinued and a pressure bleed-up in the PCV system may be monitored; and the pressure bleed-up obtained at the first engine temperature and at the second engine temperature may be compared to indicate a degradation of a positive crankcase ventilation system (PCV) valve and a cylinder valve. The first engine temperature may be attained after a threshold duration has elapsed since an engine shut-down, and the second engine temperature may be attained immediately after a subsequent engine shut-down, the first engine temperature lower than the second engine temperature.

FIG. 7 shows an example plot 700 of pressure in the PCV system during PCV valve diagnostics. The example plot shows vacuum pulldown phase (decrease in pressure) and vacuum build up phase (increase in pressure) during a cold engine PCV valve diagnostic routine (as described in FIG. 5) or a hot engine PCV valve diagnostic routine (as described in FIG. 6). The x-axis denotes time and the y-axis denoted pressure in the PCV system as estimated via a pressure sensor (such as pressure sensor 77 in FIG. 1) coupled to the crankcase ventilation tube of the PCV system. Line 702 shows a variation in pressure over time. Dashed line 703 denotes a threshold pressure and if during the diagnostic routine (between time t1 and t2), the pressure increases above the threshold 703, the PCV valve is determined to be degraded.

Prior to time t1, during the vacuum pulldown phase, the PCV valve is in an open position and the pressure decreases to build vacuum in the PCV system. At time t1, the PCV valve is closed and an increase in pressure is monitored. If the pressure remains below the threshold 703 during the diagnostic routine (prior to time t2), it is inferred that the PCV valve is not degraded. However, as shown by dotted line 704, if the pressure increases to above the threshold 703, degradation of the PCV valve may be indicated.

FIG. 8 shows an example timeline 800 illustrating a positive crankcase ventilation (PCV) system diagnostic test routine carried out in a cold engine. The horizontal (x-axis) denotes time and the vertical markers t1-t5 identify significant times in the PCV valve diagnostic routine.

The first plot, line 802, shows a change in vehicle speed over time. The second plot, line 804, shows engine speed as estimated via a crankshaft position sensor. The third plot, line 806, shows injection of fuel to the engine cylinders for combustion and engine operation. The fourth plot, line 808, shows a position of an isolation valve positioned in a conduit that fluidically couples the PCV system to the intake passage upstream of a compressor. The fifth plot, line 810, shows a position of the cylinder valves. The cylinder valves include each intake valve and exhaust valve coupled to each engine cylinder. The sixth plot, line 812, shows a position of a PCV valve positioned in a conduit that fluidically couples the PCV system to the intake passage downstream of the compressor. The seventh plot, line 814, shows a change in intake manifold pressure, as estimated via an intake manifold pressure. Dashed line 815 denotes a threshold intake pressure above which engine operation mat be discontinued. The eighth plot, line 816, shows a change in PCV system pressure, as estimated via a pressure sensor coupled to a PCV system conduit, during the PCV valve diagnostic routine. Dashed line 818 denotes a threshold PCV pressure above which a degradation in either the PCV valve or an engine cylinder valve is indicated during the PCV valve diagnostic routine.

Prior to time t1, the vehicle is propelled via engine torque. Fuel is injected into engine cylinders where combustion of air-fuel generates energy. The cylinder valves are active and the intake valves and exhaust valves open and close periodically based on the engine cycle. Each of the isolation valve and the PCV valve are maintained in their respective open positions. Intake manifold is maintained at a lower pressure during engine operation and PCV system pressure is not monitored prior to initiation of PCV valve diagnostic routine.

At time t1, the vehicle stops and fueling is discontinued to shut-down the engine. Between time t1 and t2, the vehicle and the engine are not operated. During engine shut-down, the intake manifold pressure increases. After a predetermined duration (duration between time t1 and t2) has elapsed since the immediately prior engine shut-down at time t1, a PCV valve diagnostic routine is initiated at time t2. At time t2, the isolation valve is closed and an on-board motor is activated to spin the engine. As the engine is rotated, vacuum builds up in the intake manifold and the generated negative pressure is transferred to the PCV system via the PCV valve. At time t3, in response to the intake manifold pressure reducing to the threshold 815, the motor is deactivated and engine spinning via the motor is discontinued. The cylinder valves of deactivatable cylinders are closed via actuation of a variable displacement engine (VDE) mechanism. Engine spinning is stopped at a desired position at which the cylinder valves of the non-deactivatable cylinders are closed. In this way, all engine cylinder valves are closed at time t3.

Between time t3 and t4, the vacuum is transferred from the intake manifold to the PCV system via the open PCV valve. At time t4, in response to the PCV system being evacuated, the PCV valve is actuated to a closed position. By closing each of the isolation valve, the engine cylinder valves, and the PCV valve, the PCV system is sealed. An increase in PCV system pressure is monitored over a predetermined duration (between time t4 and t5). Upon completion of the predetermined duration it is determined that the PCV system pressure increases to above the threshold 818 indicating that either the PCV valve or an engine cylinder valve is degraded. A PCV valve diagnostic routine is carried out in a hot-engine condition to differentiate between degradation of the PCV valve and the cylinder valve. An example, diagnostic routine to differentiate between degradation of the PCV valve and the cylinder valve is discussed in FIG. 9.

However, if at time t5 it was indicated, as shown by dashed line 817, that the PCV pressure is lower than the threshold 818, it may be indicated that each of the PCV valve and the cylinder valves are not degraded.

FIG. 9 shows an example timeline 900 illustrating a positive crankcase ventilation (PCV) system diagnostic test routine carried out in a hot engine. The horizontal (x-axis) denotes time and the vertical markers t1-t5 identify significant times in the PCV valve diagnostic routine.

The first plot, line 902, shows a change in vehicle speed over time. The second plot, line 904, shows engine speed as estimated via a crankshaft position sensor. The third plot, line 906, shows injection of fuel to the engine cylinders for combustion and engine operation. The fourth plot, line 908, shows a position of an isolation valve positioned in a conduit that fluidically couples the PCV system to the intake passage upstream of a compressor. The fifth plot, line 910, shows a position of the cylinder valves. The cylinder valves include each intake valve and exhaust valve coupled to each engine cylinder. The sixth plot, line 912, shows a position of a PCV valve positioned in a conduit that fluidically couples the PCV system to the intake passage downstream of the compressor. The seventh plot, line 914, shows a change in intake manifold pressure, as estimated via an intake manifold pressure. Dashed line 915 denotes a threshold intake pressure above which engine operation may be discontinued. The eighth plot, line 916, shows a change in PCV system pressure, as estimated via a pressure sensor coupled to a PCV system conduit, during the PCV valve diagnostic routine. Dashed line 918 denotes a threshold PCV pressure above which a degradation in either the PCV valve or an engine cylinder valve is indicated during the PCV valve diagnostic routine. The ninth plot, line 920 shows a flag indicating degradation of the cylinder valve (such as an intake valve and/or an exhaust valve) or the PCV valve.

Prior to time t1, the vehicle is propelled via engine torque. Fuel is injected into engine cylinders where combustion of air-fuel generates energy. The cylinder valves are active and the intake valves and exhaust valves open and close periodically based on the engine cycle. Each of the isolation valve and the PCV valve are maintained in their respective open positions. Intake manifold is maintained at lower pressure during engine operation and PCV system pressure is not monitored prior to initiation of PCV valve diagnostic routine.

At time t1, the vehicle stops and fueling is discontinued to shut-down the engine. Between time t1 and t2, the vehicle is stopped and the engine spins down to a complete stop. Immediately after engine spin-down, while the engine is still hot, at time t2, a PCV valve diagnostic routine is initiated. At time t2, the isolation valve is closed and an on-board motor is activated to spin the engine. As the engine is rotated, vacuum builds up in the intake manifold and the generated negative pressure is transferred to the PCV system via the PCV valve. At time t3, in response to the intake manifold pressure reducing to the threshold 915, the motor is deactivated and engine spinning via the motor is discontinued. The cylinder valves of deactivatable cylinders are closed via actuation of a variable displacement engine (VDE) mechanism. Engine spinning is stopped at a desired parking position at which the cylinder valves of the non-deactivatable cylinders are closed. In this way, all engine cylinder valves are closed at time t3.

Between time t3 and t4, the vacuum is transferred from the intake manifold to the PCV system via the open PCV valve. At time t4, in response to the PCV system being evacuated, the PCV valve is actuated to a closed position. By closing each of the isolation valve, the engine cylinder valves, and the PCV valve, the PCV system is sealed. An increase in PCV system pressure is monitored over a predetermined duration (between time t4 and t5). Upon completion of the predetermined duration, at time t5, it is determined that the PCV system pressure remains below the threshold 918 indicating that the PCV valve is not degraded and that an engine cylinder valve is degraded. A flag (diagnostic code) is set at time t5 indicating degradation of one or more cylinder valves.

However, if at time t5 it was indicated, as shown by dashed line 917, that the PCV pressure is higher than the threshold 918, it may be indicated (via a flag 919) that the PCV valve is degraded and the cylinder valves are not degraded.

In this way, by monitoring increase in pressure in a sealed PCV system during cold and hot engine conditions, it is possible to differentiate and identify degradation of the PCV valve and an engine cylinder valve during a vehicle key-off condition.

In one example, a method comprises differentiating between degradation of a positive crankcase ventilation system (PCV) valve and a cylinder valve based on a rate of pressure bleed-up in a PCV system during each of a cold-engine condition and a hot-engine condition. The preceding example method further comprises, additionally or optionally, the cold-engine condition includes a lower than threshold engine temperature attained after a threshold duration has elapsed since an engine shut-down, and the hot-engine condition includes a higher than threshold engine temperature immediately after another engine shut-down. In any or all of the preceding examples, additionally or optionally, the PCV valve is positioned in a first conduit that fluidically couples the PCV system to an intake passage downstream of a compressor. In any or all of the preceding examples, additionally or optionally, the cylinder valve is one of an intake valve and an exhaust valve coupled to an engine cylinder. In any or all of the preceding examples, the method further comprising, additionally or optionally, during each of the cold-engine condition and the hot-engine condition, closing an isolation valve positioned in a second conduit that fluidically couples the PCV system to the intake passage upstream of the compressor, and then spinning the engine unfueled. In any or all of the preceding examples, the method further comprising, additionally or optionally, during each of the cold-engine condition and the hot-engine condition, closing an isolation valve positioned in a second conduit that fluidically couples the PCV system to the intake passage upstream of the compressor, and then spinning the engine unfueled. In any or all of the preceding examples, the method further comprising, additionally or optionally, in response to intake manifold negative pressure reaching a threshold pressure, stopping the engine, and sealing intake and exhaust valves for all cylinders of the engine. In any or all of the preceding examples, additionally or optionally, sealing the intake valves and exhaust valves includes sealing intake valves and exhaust valves of deactivatable cylinders via actuation of a variable displacement engine (VDE) mechanism, and sealing intake valves and exhaust valves of non-deactivatable cylinders by spinning the engine unfueled to park each of the non-deactivatable cylinders in a position with respective intake valve and exhaust valve closed. In any or all of the preceding examples, the method further comprising, additionally or optionally, upon sealing the intake valves and exhaust valves, routing air from the PCV system to the intake passage via the PCV valve, the PCV valve closing in response to a threshold negative pressure being reached in the PCV system. In any or all of the preceding examples, the method further comprising, additionally or optionally, upon closing of the PCV valve, monitoring a rate of pressure bleed-up in the PCV system via a pressure sensor coupled to the second conduit. In any or all of the preceding examples, additionally or optionally, the differentiating between degradation of the PCV valve and the cylinder valve includes indicating degradation of the PCV valve in response to a higher than threshold rate of pressure bleed-up in the PCV system during each of the cold-engine condition and the hot-engine condition. In any or all of the preceding examples, additionally or optionally, the differentiating between degradation of the PCV valve and the cylinder valve further includes indicating degradation of the cylinder valve in response to the higher than threshold rate of pressure bleed-up in the PCV system during the cold-engine condition and a lower than threshold rate of pressure bleed-up during the hot-engine condition. In any or all of the preceding examples, the method further comprising, additionally or optionally, in response to indication of degradation of the PCV valve, reducing operation of a turbocharger during immediately subsequent drive cycles.

Another example method for an engine comprises: at both a first engine temperature and a second engine temperature, spinning an engine unfueled to establish a threshold negative pressure in a positive crankcase ventilation system and then discontinuing spinning the engine and monitoring a pressure bleed-up in the PCV system; and comparing the pressure bleed-up obtained at the first engine temperature and at the second engine temperature to indicate a degradation of a positive crankcase ventilation system (PCV) valve and a cylinder valve. The preceding example method further comprises, additionally or optionally, the first engine temperature is attained after a threshold duration has elapsed since an engine shut-down, and the second engine temperature is attainted immediately after a subsequent engine shut-down, the first engine temperature lower than the second engine temperature. In any or all of the preceding examples, additionally or optionally, the comparing the pressure bleed-up to indicate the degradation of the valve and the cylinder valve includes: monitoring a first rate of pressure bleed-up in a sealed PCV system at the first temperature, monitoring a second rate of pressure bleed-up in a sealed PCV system at the second temperature, comparing each of the first rate and the second rate to a threshold rate, in response to each of the first rate and the second rate being higher than the threshold rate, indicating degradation of the PCV valve, and in response to the first rate being higher than the threshold rate, and the second rate being lower than the threshold rate, indicating degradation of the cylinder valve. In any or all of the preceding examples, additionally or optionally, sealing the PCV system includes closing each of the PCV valve housed in a first conduit coupling a crankcase to the intake passage upstream of a compressor, an isolation valve housed in a second conduit coupling the crankcase to the intake passage upstream of the compressor, and each intake valve and exhaust valve of each engine cylinder. In any or all of the preceding examples, additionally or optionally, establishing the threshold negative pressure in a PCV system includes, upon an engine intake manifold pressure reaching the threshold negative pressure, evacuating the PCV system via the PCV valve until PCV system pressure reaches the threshold negative pressure, and then closing the PCV valve.

In yet another example, an engine system, comprises: a controller storing instructions in non-transitory memory that, when executed, cause the controller to: responsive to a predetermined time duration elapsing since a key-off event, spin an engine un-fueled to generate a negative pressure in an intake manifold, transfer the generated negative pressure to a positive crankcase ventilation system (PCV) via a PCV valve housed in a conduit coupling the intake manifold to the PCV system, seal the PCV system, and monitor a first rate of pressure increase in the PCV system via a PCV system pressure sensor, responsive to the first rate of pressure increase being higher than a threshold rate, immediately after a subsequent engine shut-down, spin the engine unfueled to generate the negative pressure in the intake manifold, transfer the generated negative pressure to PCV system via the PCV valve, seal the PCV system, and monitor a second rate of pressure increase in the PCV system via the PCV system pressure sensor; and in response to the second rate of pressure increase being higher than the threshold rate, indicate degradation of the PCV valve. The preceding example method further comprises, additionally or optionally, the controller includes further instruction to: in response to the first rate of pressure increase being higher than the threshold rate and the second rate of pressure increase being lower than the threshold rate, indicate degradation of at least one intake valve and exhaust valve coupled to an engine cylinder. In any or all of the preceding examples, additionally or optionally, spinning the engine unfueled includes spinning the engine via an on-board electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
differentiating between degradation of a positive crankcase ventilation system (PCV) valve and a cylinder valve based on a rate of pressure bleed-up in a PCV system during each of a cold-engine condition and a hot-engine condition.

2. The method of claim 1, wherein the cold-engine condition includes a lower than threshold engine temperature attained after a threshold duration has elapsed since an engine shut-down, and the hot-engine condition includes a higher than threshold engine temperature immediately after another engine shut-down.

3. The method of claim 1, wherein the PCV valve is positioned in a first conduit that fluidically couples the PCV system to an intake passage downstream of a compressor.

4. The method of claim 1, wherein the cylinder valve is one of an intake valve and an exhaust valve coupled to an engine cylinder.

5. The method of claim 3, further comprising, during each of the cold-engine condition and the hot-engine condition, closing an isolation valve positioned in a second conduit that fluidically couples the PCV system to the intake passage upstream of the compressor, and then spinning the engine unfueled.

6. The method of claim 5, further comprising, in response to intake manifold negative pressure reaching a threshold pressure, stopping the engine, and sealing intake and exhaust valves for all cylinders of the engine.

7. The method of claim 6, wherein sealing the intake valves and exhaust valves includes sealing intake valves and exhaust valves of deactivatable cylinders via actuation of a variable displacement engine (VDE) mechanism, and sealing intake valves and exhaust valves of non-deactivatable cylinders by spinning the engine unfueled to park each of the non-deactivatable cylinders in a position with respective intake valve and exhaust valve closed.

8. The method of claim 6, further comprising, upon sealing the intake valves and exhaust valves, routing air from the PCV system to the intake passage via the PCV valve, the PCV valve closing in response to a threshold negative pressure being reached in the PCV system.

9. The method of claim 8, further comprising, upon closing of the PCV valve, monitoring a rate of pressure bleed-up in the PCV system via a pressure sensor coupled to the second conduit.

10. The method of claim 9, wherein the differentiating between degradation of the PCV valve and the cylinder valve includes indicating degradation of the PCV valve in response to a higher than threshold rate of pressure bleed-up in the PCV system during each of the cold-engine condition and the hot-engine condition.

11. The method of claim 10, wherein the differentiating between degradation of the PCV valve and the cylinder valve further includes indicating degradation of the cylinder valve in response to the higher than threshold rate of pressure bleed-up in the PCV system during the cold-engine condition and a lower than threshold rate of pressure bleed-up during the hot-engine condition.

12. The method of claim 1, further comprising, in response to indication of degradation of the PCV valve, reducing operation of a turbocharger during immediately subsequent drive cycles.

13. A method, comprising:
at both a first engine temperature and a second engine temperature, spinning an engine unfueled to establish a threshold negative pressure in a positive crankcase ventilation system and then discontinuing spinning the engine and monitoring a pressure bleed-up in the PCV system; and
comparing the pressure bleed-up obtained at the first engine temperature and at the second engine temperature to indicate a degradation of a positive crankcase ventilation system (PCV) valve and a cylinder valve.

14. The method of claim 13, wherein the first engine temperature is attained after a threshold duration has elapsed since an engine shut-down, and the second engine temperature is attainted immediately after a subsequent engine shut-down, the first engine temperature lower than the second engine temperature.

15. The method of claim 13, wherein the comparing the pressure bleed-up to indicate the degradation of the valve and the cylinder valve includes:
monitoring a first rate of pressure bleed-up in a sealed PCV system at the first temperature;
monitoring a second rate of pressure bleed-up in a sealed PCV system at the second temperature;
comparing each of the first rate and the second rate to a threshold rate;
in response to each of the first rate and the second rate being higher than the threshold rate, indicating degradation of the PCV valve; and
in response to the first rate being higher than the threshold rate, and the second rate being lower than the threshold rate, indicating degradation of the cylinder valve.

16. The method of claim 15, wherein sealing the PCV system includes closing each of the PCV valve housed in a first conduit coupling a crankcase to the intake passage upstream of a compressor, an isolation valve housed in a second conduit coupling the crankcase to the intake passage upstream of the compressor, and each intake valve and exhaust valve of each engine cylinder.

17. The method of claim 13, wherein establishing the threshold negative pressure in a PCV system includes, upon an engine intake manifold pressure reaching the threshold negative pressure, evacuating the PCV system via the PCV valve until PCV system pressure reaches the threshold negative pressure, and then closing the PCV valve.

18. A system, comprising:
a controller storing instructions in non-transitory memory that, when executed, cause the controller to:
responsive to a predetermined time duration elapsing since a key-off event, spin an engine un-fueled to generate a negative pressure in an intake manifold, transfer the generated negative pressure to a positive crankcase ventilation system (PCV) via a PCV valve housed in a conduit coupling the intake manifold to the PCV system, seal the PCV system, and monitor a first rate of pressure increase in the PCV system via a PCV system pressure sensor;
responsive to the first rate of pressure increase being higher than a threshold rate, immediately after a subsequent engine shut-down, spin the engine un-fueled to generate the negative pressure in the intake manifold, transfer the generated negative pressure to PCV system via the PCV valve, seal the PCV system, and monitor a second rate of pressure increase in the PCV system via the PCV system pressure sensor; and
in response to the second rate of pressure increase being higher than the threshold rate, indicate degradation of the PCV valve.

19. The system of claim 18, wherein the controller includes further instruction to: in response to the first rate of pressure increase being higher than the threshold rate and the second rate of pressure increase being lower than the threshold rate, indicate degradation of at least one intake valve and exhaust valve coupled to an engine cylinder.

20. The system of claim 18, wherein spinning the engine unfueled includes spinning the engine via an on-board electric motor.

* * * * *